Oct. 21, 1958     H. H. WATSON     2,856,798

METHOD OF MAKING SAWS

Original Filed Nov. 16, 1954

INVENTOR.
HERMAN H. WATSON

BY *Shepherd & Campbell*

ATTORNEYS.

United States Patent Office 2,856,798
Patented Oct. 21, 1958

2,856,798
METHOD OF MAKING SAWS

Herman H. Watson, Dallas, Ga., assignor to Paulding Machine & Tool Co., Dallas, Ga., a corporation of Georgia Original application November 16, 1954, Serial No. 469,135, now Patent No. 2,771,918, dated November 27, 1956. Divided and this application November 16, 1956, Serial No. 622,612

2 Claims. (Cl. 76—112)

This invention relates to a method of making saws and more particularly to power driven saws such as band saws, circular disc saws, and the like, in which a multiplicity of teeth are disposed along the edge of a moving carrier element such as a band or disc.

The method of my invention is primarily for use in the rapid and economical formation upon a blank, of saw teeth like those shown in my copending application Serial No. 469,135 filed November 16, 1954 of which this application is a division. Application 469,135 has issued as Patent No. 2,771,918, dated November 27, 1956.

Figure 1:
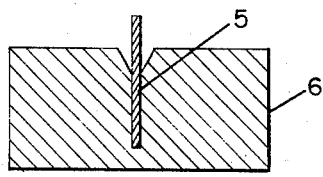
Figure 2:
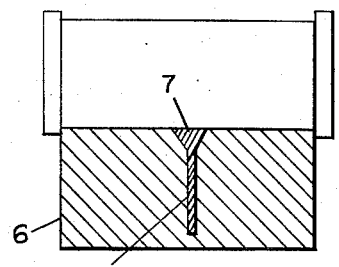
Figure 3:
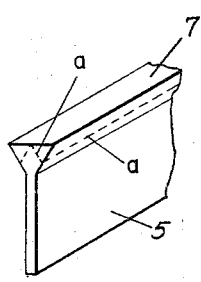
Figure 4:
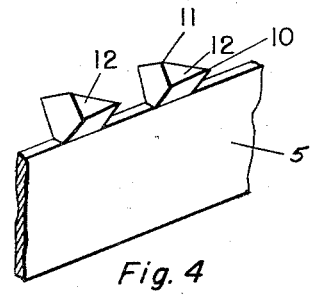
Figure 5:
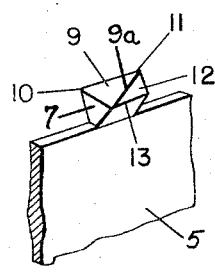
Figure 6:
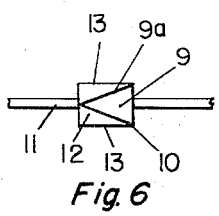
Figure 7:
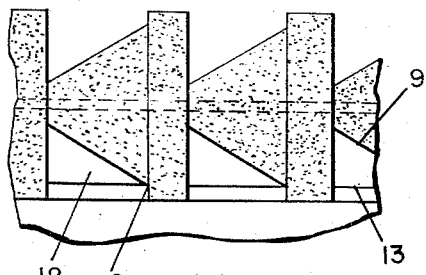
Figure 8:
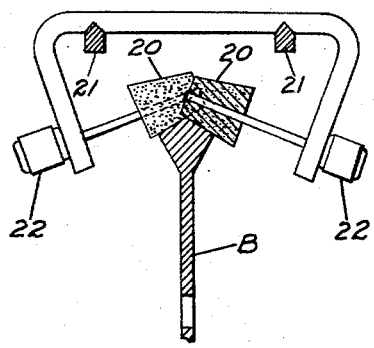

The advantages of my improved saw and method of making the same will be best understood by reference to the accompanying drawing, wherein:

Fig. 1 is a transverse vertical section through a die with a blank placed therein preparatory to swaging the top edge of the blank, Fig. 2 is a transverse vertical section through the blank of Fig. 1 showing the metal of the upper edge portion of the blank swaged out to produce a continuous, flaring Y shaped head, Fig. 3 is a perspective view of the blank and head, illustrating in dotted lines how the head is to have its edges cut away through a portion only of the height of the head to leave teeth that will have their front ends, substantially, diamond shaped, Fig. 4 is a perspective view of the carrier blank showing a pair of the finished teeth thereon which blank may be used as a band or hack saw blade, Fig. 5 is a sectional perspective view looking from the rear of one of the teeth, Fig. 6 is a plan view of one of the teeth, Fig. 7 is a side view illustrating a grinding wheel shaped to form the spaced teeth and to relieve the same in the same operation by slicing transversely across the swaged web or head, and Fig. 8 is a transverse sectional view through a portion of a saw blank, illustrating the step of removing the outer edge portions of the Y shaped head to leave the diamond shaped head, described.

The parts are magnified in all the figures of the drawing.

Like numerals designate corresponding parts in all of the figures of the drawing.

I have found that an expeditious and efficient way of producing a saw having the desired characteristics is to start with a blank 5 and by applying pressure to the edge of the same in a die 6, swage said edge out to form a flaring web or rib 7 along said edge. The rib is then sliced through transversely at a plurality of points to leave a row of outstanding, tooth forming abutments. In the transverse slicing of the rib 7 (which may be effected by punch press, grinding or any other suitable means) a tool of such shape is employed that the upper portions of the abutments are cut away to leave flat triangular top surfaces 9, the apices of such triangular top surfaces being at the top central portion of the front wall of the tooth and extending thence along the lines 9ª to the rear corners 10 of the abutments; and it is the point 11 of the tooth which first contacts the material being cut and which starts the cutting action. The formation of the surfaces 9 relieves the teeth in their action. The material of the abutments is further slabbed off upon each side of their longitudinal center lines to form inclined faces 12, the upper edges of which coincide with the lines 9ª and the lower edges of which terminate at the side edges 13 of the abutments. These side edges represent the point of greatest width of the abutments. The side edges of the abutments are preferably in parallelism with each other and when they are in parallelism with each other and in alignment with the side edges of all the other abutments, it follows that the faces 12 all lie in the same plane. This is highly advantageous since by passing a grinding wheel along the row of these surfaces 12 they may all be ground accurately to the same extent, whereby to effect the sharpening of the saw.

While I have stated that the transverse cutting of the blank to produce the abutments is effected before the slabbing off of the outer upper corners of the web, to produce the inclined surfaces 12, I wish it to be understood that the invention is not limited in this respect since the slabbing off may be effected before the transverse slicing, if desired. In Fig. 3 it is indicated by the dotted lines "a" how the outer free corners of the web, as it leaves the forming die, may be cut away to the angle to leave the surfaces 12. Whether the slabbing off is effected before or after the transverse slicing the end result is to leave tooth forming abutments the front faces of which are of substantially diamond shape with the top of the diamond constituting the initial cutting point, at about the center line of the web.

Where the transverse slicing or cutting is effected by a punch press the male members of the punching mechanism may, if desired, be of such shape as to effect a slight undercutting of the front walls of the teeth to impart a rake thereto, this being common practice in the formation of saw teeth.

The transverse distance between the side edges 13 of the teeth represents the approximate width of the kerf which will be cut by this saw. I am able to cut even very hard material with this saw while forming a much narrower kerf than is the case with ordinary saws. Many, and in fact most, of the saws now used have teeth of spring formation capable of being bent outwardly and alternately in opposite directions to give a set to the saw. Since these teeth tend to move back toward alignment with the carrier body under the stress imposed upon them, and thus require resetting, there is always the tendency to give the saw too much set. Thus the outwardly projecting ends, when moved in sawing direction, have a tendency to gouge the material instead of cutting it. Since the edges 13 represent the terminal portions of what are, in effect, solid integral protuberances extending from the carrier body, it follows that there is no gouging of the character indicated, in the operation of this saw. Upon the contrary there is a clean, non-tearing cutting action.

The saw of this invention presents important functional advantages in the cutting of meat, for example, for the following reasons:

The cutting of meat, fish aind like animal products differs from the cutting of almost all other substances in that the operator is alternately cutting through flesh (meat) and bone. Where the saw is so constructed as to cut a sufficiently wide kerf to adapt it to pass readily through bone it is so wide that when passing through the fleshy parts it unnecessarily cuts and shreds many meat fibres. These shredded meat particles, being greasy and adherent, collect in the gullets between the teeth and are deposited as a greasy film or paste over the meat surface that has been cut. Since these particles present many cut surfaces to the air their presence would tend to induce quick spoilage of the meat, unless they were removed. The saw of the present invention, acting as it does by a true cutting rather than a gouging action does not macerate the fleshy parts in passing through them and in addition, does not create so wide a kerf in the bony parts.

An important feature of this invention is that the teeth are so shaped and the surfaces to be created lie in such planes that the material that has to be removed may be removed by a straight line thrust by a grinder or a punch press. As a result a multiplicity of the teeth may be acted on en banc instead of each tooth having to be formed or treated separately. For example the faces 12 may all be formed by a continuous operation as in Fig. 8 where a blank B, which may be the disc of a circular saw or the blade of a hack or band saw, is subjected to the cutting or grinding action of two small grinding wheels 20 mounted to move on ways 21 and driven, if desired, by small motors 22. Or the grinding wheels may be on a fixed support and the blank B may be rotated past them.

Where a punch press is used the hardening treatments given all saw blades takes place immediately after the cutting of the teeth but where a grinder is used for the cutting the hardening may take place before the cutting. Thus there is no heat treatment which would be likely to produce scale, after grinding.

By my method I am able to deliver to the user a saw blade having the advantages recited and one which is clean, sharp and free of scale.

The set-forming abutments of which the edges 13 are the terminus, being unyielding, and hardened will not readily change their formation. Thus my saw will be very long lived and may be kept sharp and effective throughout its life with very little attention.

In the case of saws having alternately bent teeth to create a set, there is a twisting tendency imparted to the carrier body. No such tendency is present in the saw of my invention since the leading or cutting point 11 and the side edges 13 of the set-forming abutments all lie and travel in parallel paths. The edges 13 and the rear transverse edges of the teeth all lie, as shown, in the same transverse plane, which plane is at the widest point of the diamond shaped front face of the teeth. The action of the point 11 initiates a cut of V shape which increases in width to the width of the abutments as the teeth sink into the material being cut.

This saw is not dependent upon the exercise of any great pressure against the work in order to effect a cut. In this respect it differs from any other saw of which I have knowledge. The absence of pressure against the work eliminates much heat that would otherwise be generated and avoids the sticking or freezing of the saw in the work. This absence of heating enables me to saw a stack of thin sheets of metal without resultant sticking of the sheets together.

The invention is not limited to the precise construction shown. It includes within its purview whatever changes fairly come within either the terms or the spirit of the appended claims.

I claim:

1. The herein-described method of forming a saw which consists of compressing the edge of a metallic blank to provide a continuous, flaring, Y shaped web, the outer free edges of which lie outwardly of the side faces of the blank, cutting the blank transversely through said web from its top to substantially its juncture with the body of the web and at a plurality of points, whereby to produce a row of tooth forming abutments along the edge of the blank and in said transverse cutting removing that portion of the material of each of said abutments lying above a line extending from the forward and top edges of the abutments to the point of greatest width at the rear end of each tooth, whereby to leave a triangular flat top upon each tooth, which has its apex at the forward top center of the tooth, and cutting away the material of the abutments to provide sloping side surfaces which extend from the edges of said triangular top face to the side edges of the abutments at the widest portions of said abutments.

2. The herein-described method of treating a relatively thin metal blank to produce a saw which consists of compressing an edge of the blank to swage it out to produce a continuous riblike head of Y shape in cross section, cutting away the outer corners of the Y shaped portion of the head through a portion only of the height of said Y shaped portion to leave said head of diamond shape in cross section, and transversely slicing through said head with a tool shaped to divide the head into a plurality of spaced tooth forming abutments having flat top faces which extend from the forward points of the teeth to the rear corners of said teeth.

References Cited in the file of this patent

UNITED STATES PATENTS

| | | |
|---|---|---|
| 1,690,803 | Vander Wee | Nov. 6, 1928 |
| 1,918,770 | McLean | July 18, 1933 |